United States Patent [19]

Hallenbeck et al.

[11] Patent Number: 4,666,518
[45] Date of Patent: May 19, 1987

[54] INSIDE AND OUTSIDE TIRE PAINT FOR GREEN TIRES

[75] Inventors: Victor L. Hallenbeck, Brecksville; Chong K. Rhee, Broadview Heights, both of Ohio

[73] Assignee: The Uniroyal Goodrich Tire Company, Akron, Ohio

[21] Appl. No.: 877,575

[22] Filed: Jun. 23, 1986

Related U.S. Application Data

[63] Continuation-in-part of Ser. No. 685,110, Dec. 21, 1984, abandoned.

[51] Int. Cl.$^4$ .............................................. B28B 7/36
[52] U.S. Cl. ................. 106/38.25; 106/271; 106/272
[58] Field of Search ............... 106/38.22, 271, 272, 106/38.25

[56] References Cited

U.S. PATENT DOCUMENTS 4,325,852  4/1982  Hallenbeck .................. 523/326
4,329,265  5/1982  Hallenbeck .................. 524/487

Primary Examiner—Lorenzo B. Hayes
Attorney, Agent, or Firm—Harry F. Pepper, Jr.; Alfred D. Lobo

[57] ABSTRACT

A recipe is provided for an aqueous inside and/or outside paint for green tires which are to be vulcanized in a mold in cooperation with a hot, pressurized inner bladder. The aqueous paint contains no silicone release agent, hydrocarbon solvent or rubber latex, but only an air bleeding pigment such as carbon black for the outside paint or mica for the inside paint, and surfactant which are blended into a hot wax melt to form a stable dispersion. The melt contains a major amount of a lower melting wax such as paraffin wax, and a minor amount of a higher melting wax such as carnauba wax based on the total weight of wax. The carnauba wax may be dispensed within the outside tire paint for passenger car tires. The essential ingredients for the inside tire paint are the same as those used for the outside tire paint, except that the ratios in which they are present are different to accommodate the disparate requirements for flow of the tire's rubber surfaces during the vulcanizing cycle.

8 Claims, 2 Drawing Figures

INSIDE AND OUTSIDE TIRE PAINT FOR GREEN TIRES

CROSS-REFERENCE TO RELATED APPLICATION

This is a continuation-in-part of Ser. No. 685,110 filed Dec. 21, 1984 abandoned.

BACKGROUND OF THE INVENTION

Many different processes have been employed to cure (vulcanize) green tire carcasses in a mold, but most favored are machines of the Bag-O-Matic type made by McNeil Corp., and Auto-Form made by NRM Corp., in which machines a high internal bladder pressure is used while limiting the vulcanizing temperature (see for example, U.S. Pat. Nos. 2,066,265; 3,489,833; 3,579,626 and 4,027,543; and *"The Applied Science of Rubber"*, W. J. S. Naunton (1961), pp 1053–1083). The latter publication describes various tire curing systems which have been used including those employing circulating hot water, dead-end hot water, and steam. Some use high-pressure steam in the bladder followed by lower pressure steam; some use high-pressure steam followed by high-pressure dead-end hot water; and others use high pressure steam followed by circulating high-pressure hot water. During molding, the pressurized heated bladder is forced against the inner surface of the tire which has been precoated with an inside tire paint, until vulcanization is completed. The bladder is then depressurized, deflated and withdrawn from the interior of the tire.

Tire paints are so termed because a thin film of a liquid dispersion is painted onto a green tire. The tire paint is dried on the green tire which is then vulcanized (cured) in a tire mold. Without tire paints a vulcanized tire could not be removed from a mold without the tire being damaged. Therefore, the tire paint must be so adapted as to satisfy critical surface requirements of a tire being molded, during all stages of the molding cycle, yet function as a release agent which also facilitates the finishing of the tire. A tire's outer and inner surfaces are each contacted during the molding cycle by the surface of the mold and the bladder respectively, and the dynamics of movement of the outer tire surface and the inner tire surface are not the same. Therefore, it is conventional to use an outside tire paint for the outer surface, and an inside tire paint for the inner surface; and, the outside and inside tire paints generally have different ingredients.

It would be more convenient and far more economical to use outside and inside tire paints in which the ingredients are substantially the same and only their relative amounts in the paints differs. A composition for such paints and methods for producing each are disclosed in our U.S. Pat. Nos. 4,325,852 and 4,329,265 the disclosures of which are incorporated by reference thereto as if fully set forth herein.

Many commercial inside and outside tire paints used in the past have been hydrocarbon solvent based ("solvent based"), typically having gasoline as the solvent. When solvent based paint is applied to the green tire, evaporation of the solvent leads to pollution of the atmosphere, besides being a waste of a valuable natural resource. Solvent based tire paints have been made obsolete in this country because silicone release agents ("silicone") now in use may be used in aqueous systems. Silicone is especially useful to overcome the high initial static friction when the tire is slid into the mold. Silicone provides the requisite slip well, but it also can lead to tire defects. Splice areas where tire components are spliced together are especially vulnerable to seepage of the silicone between spliced components, for example, the tread splice and the inner splice. If either of these splice areas have the slightest opening, silicone will seep into the opening and prevent self-adherence of the rubber during vulcanization. U.S. Pat. No. 3,507,247 discloses a typical prior art solvent based tire paint together with an apparatus for applying said paint. It would be desirable to have a tire paint for both the inside and outside, requiring only a change in the ratio of ingredients in the recipe, which paint is not only free of hydrocarbon solvent and silicone, but also free of rubber latex ("latex-free").

The outside green tire paint serves (i) to permit surface rubber to slip as it comes in contact with the metal mold; (ii) as a release agent when at the end of the vulcanization cycle, the outside tire surface must be separated from the mold; (iii) to allow air which is trapped between the outside tire surface and the mold to escape (bleed); and (iv) to enhance the appearance of the finished tire, thus providing a cosmetic function.

One of the principal functions of the inside green paint is to act as a lubricant between the tire inner liner and the curing bladder both during the loading or shaping stage and the stripping stage of the molding operation. Lubricity is particularly needed during inflation of the bladder in the initial and shaping stages because there is substantial relative movement between the contacting surfaces of the bladder and the tire inner liner. Unless there is adequate lubrication provided between the tire and inner liner, there is a tendency for the bladder to buckle, which may result in misshaping of the tire and consequent rejection of the tire. At the end of the molding operation when the bladder is collapsed and the tire is stripped from the bladder, there is again considerable relative movement between the contacting surfaces of the bladder and the now cured tire inner liner. Unless adequate lubrication is provided between the bladder and inner liner, the bladder tends to stick to the cured tire. This causes excessive wear and roughening of the bladder, which results in reduced bladder life. When the bladder sticks to the cured tire, it also may cause a delay in the molding operation.

Another of the principal functions of the inside green tire paint is to get rid of unwanted air bubbles between the tire inner liner and the bladder at the beginning of the shaping operation and to promote entry of air between the bladder and the tire inner liner at the end of the molding operation to avoid adhesion of the tire inner liner to the bladder when the bladder is evacuated prior to withdrawal from within the tire. The entrapment of a substantial amount of air in the form of bubbles between the bladder and the inner liner, and, failure of the liner to separate from the bladder upon evacuation of the bladder at the end of the molding cycle, may each lead to such severe defects in the molded tire as to require it to be rejected.

The paints utilized in our '852 and '265 patents consist essentially of the same, or chemically analogous materials and avoid the use of hydrocarbon solvents and silicone release agents. Though hydrocarbon solvents have generally been discontinued in the tire industry for environmental reasons, silicone release agents are still popular and economical if a person is inclined to overlook the number of defective tires (percent rejection) attributable to the use of the silicone.

A scrutiny of the listed ingredients of each recipe in our aforementioned patents discloses that the essential difference between the inside and outside tire paints is that (i) the inside tire paint includes a minor amount of carnauba wax relative to the amount of paraffin wax, and (ii) the outside tire paint contains much more rubber latex than the inside tire paint (which is termed a low rubber latex paint), and no carnauba wax.

Our early experimental work with a low rubber latex inside tire paint showed that when it was used as an outside tire paint, the outside surface of the cured tire flaked. We concluded that the rubber latex acts as a binder which keeps the paint on the tire, and that it was essential to limit the percentage of defective tires.

In further tests with the low rubber latex inside tire paint having the carnauba wax content of Example 1 (about 6% by weight of the paint) discovered that with certain large truck tires requiring long cure times, there was an unexpectedly high percentage of defects which appeared to be attributable to inadequate lubricity between the bladder and the inner surface of the green tire. As will be evident from data presented hereinbelow, the problem was high static friction during the initial phase of curing.

Since the solids of the rubber latex ("latex" for brevity) in the inside tire paint accounted for less than 1% by weight of the paint it seemed unlikely that it adversely affected lubricity, but because natural rubber latex is inherently tacky, we resolved to remove it from the recipe, and did. We were surprised to find that the lubricity appeared to be improved, and a very low percent of tires with defective inner surfaces confirmed that the rubber latex was best left out of the recipe.

Having tested the latex-free inside tire paint on numerous tires of various configurations it eventually occured to me that the rubber latex in the outside tire paint may not be contributing as much to lubricity as we once believed, though it was conjecture on our part that, lubricity or lack thereof notwithstanding, the latex was probably still essential to avoid deleterious flaking and to enhance the visual appeal of the finished tire. Only actually testing a latex free outside tire paint could satisfy our presentiment that the absence of latex was essential to an effective paint. This, we did. The results are embodied in this invention.

SUMMARY OF THE INVENTION

It has been discovered that a tire paint need not contain either silicone release agents ("silicone"), or a hydrocarbon solvent, or even a rubber latex to provide an effective tire paint for green tires which paint may be used on both the inside and outside tire surfaces with only a change in the ratios of the ingredients in the recipe.

More specifically, it has been discovered that the function of latex in prior art tire paints, which function was to facilitate displacement of trapped air, and to bind the components of the paint to the cured tire thus avoid flaking of the paint, is retained though the latex is omitted.

It is therefore a general object of the present invention to provide an aqueous green tire paint composition which is free not only of a silicone release agent and a hydrocarbon solvent, but also omits rubber latex while retaining its function.

It is a specific object of this invention to provide an aqueous green tire paint for coating the inner and outer surfaces of a tire to be vulcanized, said paint comprising, (a) a wax dispersion containing a major amount, based on the total weight of wax in the dispersion, of at least one lower melting point wax having a melting point (mp) in the range from about 50° C. to about 80° C., such as a paraffin wax, and from 0 to less than b 50 percent by weight (% by wt) of a higher melting wax having a mp in the range from about 80° C. to about 90° C., such as a carnauba wax, (b) a pigment effective to rid air ("air bleeding pigment") trapped between the tire and the mold surface, and between the inner surface of the tire and the inner bladder, said pigment having a primary particle size greater than 50 millimicrons and being chemically inert relative to the materials being vulcanized, and, (c) a surfactant in an amount sufficient to maintain said wax and pigment in a stable dispersion in water at a temperature range from about 10° C. to about 60° C., wherein said paint is essentially free of rubber latex, silicone release agent and hydrocarbon solvent, and has a solids content of from about 20 to about 60% by wt based on the total weight of the paint.

It is also a specific object of this invention to provide an aqueous green tire paint for coating the inside of a tire to be vulcanized, said paint comprising, (a) a wax dispersion containing at least 51% by wt of a lower melting wax and from 6 to about 49% by wt of higher melting wax, based on the total weight of wax, (b) mice in an amount effective to rid air trapped between the inner surface of the tire and the inner bladder, said mica having a primary particle size greater than 50 millimicrons and being chemically inert relative to the materials being vulcanized, and, (c) a surfactant in an amount sufficient to maintain said wax and mica in a stable dispersion in water at a temperature range from about 10° C. to about 60° C., wherein said paint is essentially free of rubber latex, silicone release agent and hydrocarbon solvent, and has a solids content of from about 20 to about 60% by wt based on the total weight of the paint.

It is a further specific object of this invention to provide an aqueous green tire paint for coating the outer surface of a tire to be vulcanized, said paint comprising, (a) a wax dispersion containing at least 90% by wt of lower melting wax, and from 0 to about 10% by wt of higher melting wax, based on the total weight of wax, (b) nonpelletized carbon black in an amount effective to rid air trapped between the tire and the mold surface, said carbon black having a primary particle size greater than 50 millimicrons and being chemically inert relative to the materials being vulcanized, and, (c) a surfactant in an amount sufficient to maintain said wax and carbon black in a stable dispersion in water at a temperature range from about 10° C. to about 60° C., wherein said paint is essentially free of rubber latex, silicone release agent and hydrocarbon solvent, and has a solids content of from about 20 to about 60% by wt based on the total weight of the paint.

BRIEF DESCRIPTION OF THE DRAWINGS

The foregoing and other objects and advantages of my invention will appear more fully from the following description, made in connection with the accompanying graphs depicting the characteristics of the invention in which.

DETAILED DESCRIPTION OF PREFERRED EMBODIMENTS

Figure 1:
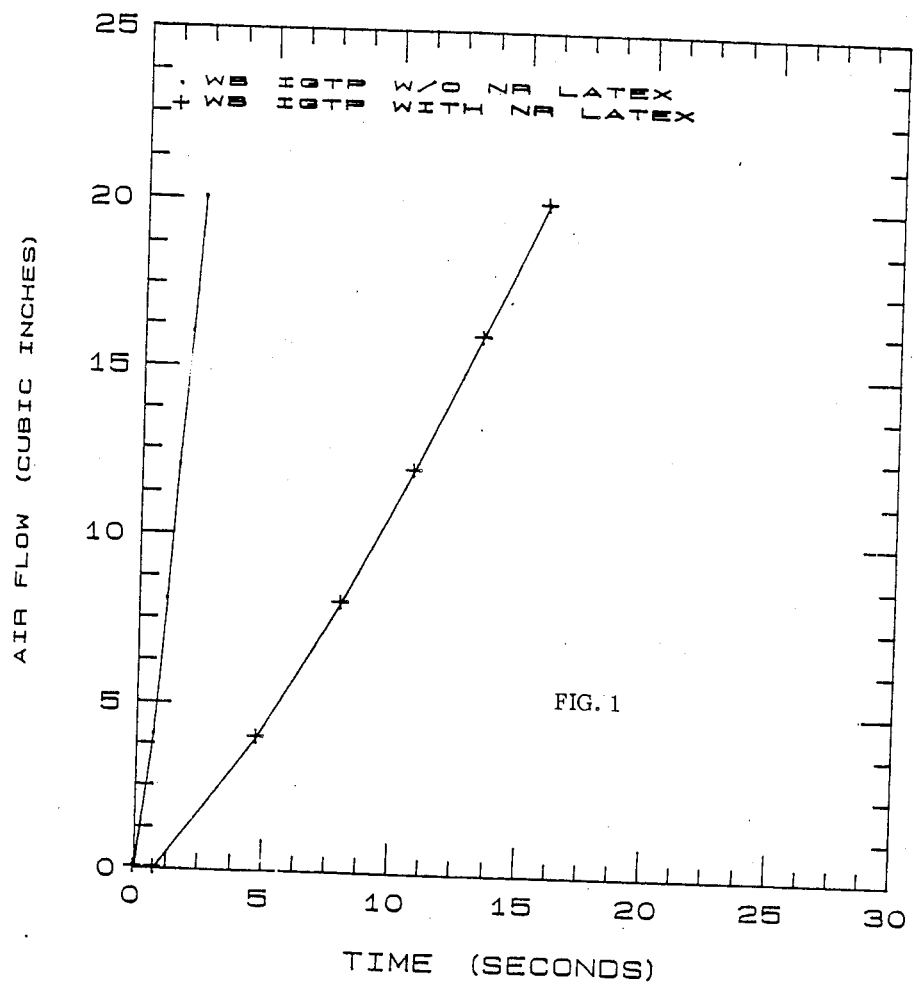
FIG. 1 is a plot of the time it takes to bleed 20 in$^3$ of air across the surface of each of two samples of inner liner material, one painted with an inside tire paint containing rubber latex, the other sample omitting the latex, but otherwise containing analogous components.

In the preferred embodiment of the invention, it has been found that the binding function of latex in a prior art tire paint which otherwise consists essentially of the same components, is retained if the latex is omitted and replaced with specified waxes and carbon black particles. Together, the waxes and carbon black in the latex-free tire paint provide highly satisfactory binding of heated paint to the tire after it is cured, and allows faster displacement (bleeding) of entrapped air while the tire is curing.

The first necessary ingredient of the novel inside and outside green tire paint of this invention is an aqueous wax dispersion in which the wax is present in an amount from about 10 to about 50% by wt, based on the total weight of solids in the dispersion. The wax dispersion serves the function of providing slip. Wax, being more compatible with rubber than silicone, does not interfere with sidewall and tread splice adhesion as does a silicone. The tire can slip and change its position as it is being conformed in the mold.

The type and amount of lower melting wax used in the wax dispersion is important for making a satisfactory outside or inside green tire paint, as is the type and amount of higher melting wax, if it is used in the recipe. Typical lower melting waxes are beeswax, candelilla wax, Japan wax, and paraffin wax, the last being most preferred. Typical higher melting waxes are carnauba wax, microcrysalline wax, palm wax and the like, the first being most preferred.

Paraffin wax(es) (for brevity, "P'wax), because of its compatibility with rubber and ready availability at an economical price, is most desirable and is preferably present in a major amount by weight relative to any other wax, in either an inside or an outside tire paint. A blend of more than one P'wax, to provide a range of melting points, may be used. In practice, the wax dispersion used for the inside tire paint is different from that used for the outside tire paint, the ratio of lower melting to higher melting wax being greater in the latter case. A P'wax with a 55° C. mp (referred to herein as "P'wax 55" for brevity) gave excellent results even when used alone in an outside tire paint of this invention. For an outside tire paint, the higher melting wax is used in a very small amount, in the range from 0 to about 10% by wt, and a larger amount in the range from about 6 to about 49% by wt may be used in an inside tire paint, based on the total wt of wax in the dispersion.

The aqueous wax dispersion is produced as described in the '265 patent using a dispersing agent, typically a soap or surfactant. Although commercially available soaps may be used to make the wax dispersion, it is desirable to form the soap in situ, using a fatty acid such as oleic, stearic, or lauric acid and an amine such as monoethanolamine.

The second necessary ingredient of the novel paint is an an air-bleeding pigment, such as mica and/or carbon black, which pigment serves the function of an air bleeding agent. The air bleeding pigment allows the air that is trapped between the tire and the mold, or the tire and the bladder, to escape. Relatively large particle size pigments, typically nonpelletized mica and carbon blacks such as those with a primary particle size greater than 50 millimicrons and upto about 44 microns, though the size is not narrowly critical so long as the pigment allows the air to bleed out during the curing cycle. Carbon black is favored in an outside tire paint because it imparts a deeper black color to the outside of the tire, thereby improving its appearance, in addition to providing the necessary air bleeding function. The types of carbon black suitable for use are those which are normally referred to as ink type blacks. Examples of preferred carbon black are those with ASTM designations N900, N990 and the like.

The paints also may contain a neutralizing agent. The purpose of the neutralizing agent is to neutralize any acidity that the carbon black may have. If the carbon black is neutralized, the stability of the paint is much improved. Although the neutralizing agent is not a necessary ingredient, it offers significant advantages by improving paint stability. Excellent results were obtained when dilute ammoninium hydroxide was used as the neutralizing agent.

It is also preferred to use an antifoam agent to decrease the foaming as the paint is being mixed, it being understood that such antifoam agent is usually also a surfactant.

The paints of this invention may be applied by any conventional means, as for example by brushing or spray coating, the latter being preferred. The paints are stable in that they can be stored for long periods of time at a temperature in the range from about 10° C. to about 60° C. before being used. If settling occurs, then a minimum of stirring is required to redisperse the ingredients.

The amount of water in the paint may be varied to give it the desirable solids content for the method of application. A solids content of from about 20 to about 40% by wt based on the total wt of the paint, has been found to be particularly desirable for spray coating. Higher solids content up to about 60% by wt may be used for brush coating, or to ship the paint from one location to another where it may be diluted prior to use.

The paints of this invention are easily produced by first making the wax dispersion. The wax dispersion is made by melting the wax. Once the wax is melted, it is vigorously agitated. The fatty acid is then added to the molten wax. The amine is then added along with about one-half (½) of the surfactant. In the mean while, the water is heated to about the same temperature as the molten wax and the hot water is added rapidly to the molten wax mixture. A hot wax dispersion will immediately form. The remaining surfactant is then added and the dispersion is cooled under steady agitation to form a stable wax dispersion. To form the paint, the ingredients are added to vigorously stirred water in the follwoing order: surfactant, dilute ammonium hydroxide, mica and/or carbon black, antifoam agent, and then the wax dispersion.

The paints of this invention may contain other nonessential ingredients for identification or other incidental purposes. The addition of nonessential ingredients for such purposes are well known to those skilled in the art and need not be discussed to define the scope of the invention claimed.

As disclosed in the '852 patent, a blend of more than one wax is especially favored for an inside tire paint. The preferred wax dispersion comprises three waxes two of which are P'waxes having melting points stepped one from the other about 15° to about 25° C., and the third is carnauba wax. The two P'waxes are preferably P'wax 55 and P'wax 72. The carnauba wax has a melting point of about 82° C. The blend of lower melting P'waxes serves the function of providing slip between the bladder and tire during the shaping operation while the higher melting carnauba wax serves as a release agent between tire and bladder at the end of the vulcanization cycle. The ratio of paraffin to carnauba wax will vary depending on the size and type of tires being vulcanized. The larger the tire, the higher the proportion of carnauba in the wax mixture. This is because the larger the tire, the longer will be the vulcanization time and therefore, the more the paraffin wax would migrate into the rubber.

In order for the outside tire paint to function effectively over a wide range of tire types and sizes, the carnauba portion of the wax should be no more than about 10% by wt of the total weight of wax. Most preferably, the outside paint will contain no carnauba wax, the entire wax content being a mixture of P'waxes. The mp of the P'waxes used depends upon the type and size of tire to be coated, and the amount, if any, of higher melting wax (say, carnauba) used. A particularly desirable ratio of P'waxes for the outside tire paint used on a passenger car tire is about equal parts by wt of P'wax 55 and P'wax 72. The ratio of wax to pigment (carbon black) is preferably in the range from about 1:6 to about 1:1, most preferred being about 1:3; and, the solids content of the outside paint is preferably in the range from about 10 to about 40%, most preferably from about 15% to about 30%.

In order for the inside tire paint to function effectively over a wide range of tire types and sizes, the carnauba portion of the wax shoud be more than about 6 but less than 50% by wt of the total weight of wax. Preferably, the carnauba wax will constitute from about 10 to 49% by wt of the total amount of wax. The remainder of the wax is paraffin. The mp of paraffin wax used in paint for the inside of the tire, as one might expect, will depend upon the type and size of tire to be cured and the level of carnauba wax used. A particularly desirable ratio for an inside tire paint for a passenger car tire has been found to be 15% carnauba, 35% P'wax 72, and 50% P'wax 55. The ratio of wax to pigment (mica) is preferably in the range from about 1:3 to about 3:1, most preferred being about 1:1; and, the solids content of the inside paint is preferably in the range from about 30% to about 60% by wt solids, about 50% being most preferred.

The ratio and also the type of waxes used will also vary depending upon the type of vulcanizing equipment used. For example, when using a vulcanizing press which does not have a center post such as an Auto-Form, more slip is required and therefore a larger proportion of paraffin wax should be used. Whereas, a Bag-O-Matic type vulcanizing press produces less slippage between bladder and tire and therefore less paraffin can be used and more carnauba.

EXAMPLE 1

An inside tire paint containing 75% by wt P'waxes and 25% by wt carnauba wax, is made with a wax dispersion having the following composition:

| Ingredient | Weight, lb. |
|---|---|
| P'wax 55 | 15.57 |
| P'wax 72 | 7.78 |
| Carnauba wax (m p 82° C.) | 7.78 |
| Oleic acid | 3.42 |
| Monoethanolamine | 2.10 |
| Surfactant (Triton X100) | 0.10 |
| Water | 63.18 |

The waxes were placed in a pot and heated to 95° C. while the water is heated to 95° C. in a separate container. The oleic acid was added to the molten wax and then the monoethanolamine was added. One-half of the surfactant was then added to the wax. The hot water was then added rapidly to the molten wax mixture. The remaining surfactant was then added to the molten wax dispersion. The mixture was cooled under steady agitation to form the stable wax dispersion.

The inside tire paint was then formulated having the following recipe:

| Ingredient | Weight, lb. |
|---|---|
| Wax dispersion (36.8% solids) | 285.60 |
| Water | 6.12 |
| Surfactant (Triton X100) | 11.76 |
| Mica | 100.00 |

The water and surfactant were blended with the wax dispersion. Then the mica was added to the mix and stirred.

The inside tire paint of this example 1 was evaluated on 10,000 passenger tires, and on several thousand bias ply truck tires, and found to be excellent. When the paint was used on truck tires, it was found that higher amounts of carnauba wax, up to about 10% by wt of all the wax, was desirable to obtain good slip an release of the tire from the bladder. It is theorized that the more compatible paraffin is diffused into the tire requiring the larger amount of carnauba wax to act as a release agent.

EXAMPLE 2

An outside tire paint containing only P'wax 55, with a total solids content of 25% is made with a wax dispersion haiving the following composition:

| Ingredient | Weight, lb. |
|---|---|
| P'wax 55 | 100.00 |
| Oleic acid | 20. |
| Monoethanolamine | 6.40 |
| Surfactant (Triton X100) | 1.80 |
| Water | 234. |

The wax was placed in a pot and heated to 70° C. When the wax had melted, it was vigorously agitated. The oleic acid was added to the molten wax. Monoethanolamine was then added at this point. In the mean while the water was heated to 70° C. in a separate container. The hot water was then added rapidly to the molten wax mixture. A hot wax dispersion immediately formed. The remaining surfactant was then added. The hot wax dispersion was maintained under steady agitation while cooling to ambient temperature. A stable wax dispersion was obtained.

The outside tire paint was then formulated having the following recipe:

| Ingredient | Weight, lb. |
| --- | --- |
| Water | 273 |
| Surfactant (Triton X100) | 14 |
| NH$_4$OH dilute (15%) | 10 |
| N900 carbon black | 53 |
| Wax Dispersion (35.4% solids) | 48 |
| Antifoam agent | 0.02 |

The water was vigorously stirred and the ingredients added in the following order: surfactant, dilute ammonium hydroxide, carbon black, antifoam agent, and then the wax dispersion.

The paint of this example 2 was evaluated on 10,000 passenger car tires and found to be excellent. A representative sample from the 10,000 tires were subjected to the usual tire tests and the results compared with those for tires coated with prior art paint compositions. In all instances the tires cured withe paints of this invention were equivalent to or better than those cured with the paints of my aforementioned patents.

The above examples demonstrate that an effective inside green tire paint can be made without using either rubber latex, silicone or hydrocarbon solvents. The above examples also demonstrate that if the level of carnauba wax is more than 6% but less than 50% of the wax content, then the paint is satisfactory over a broad range of tire sizes and types. When larger or smaller tires are to be vulcanized, a carnauba wax content outside of the 6-50% range may be satisfactory. In addition to carnauba wax, zinc stearate (mp 104°–126° C.) or other fatty acid salt lubricant may be used, particularly if less than 6% carnauba wax is used. The optimum wax ratio for a particular tire's paint can be easily determined by one having ordinary skill in the art and access to the teachings of this invention.

The foregoing examples deliberately closely parallel those used in the '852 and '265 patents to show the effect of leaving out the rubber latex which we earlier believed was an essential ingredient. When the recipe of our present invention is used to coat the outside surface of a tire with paint having a coating density in the range from about 5 to about 12 gm/sq meter, or the inside surface in the range from 20 to about 40 gm/m$^2$, measurements indicate that the dynamic coefficient of friction is generally in the range from about 0.4 to about 0.6, and that the static coefficient is in the range from about 0.7 to about 1.0, indicating excellent results comparable with, and in many instances better than those obtained with our prior art recipes.

The attractiveness of our novel recipe is not only its favorable cost but its ease of preparation, requiring only heating the wax, or blend of waxes to a temperature above its melting point to form a melt, adding hot water heated to a temperature above the melting point of the wax to the melt, agitating the mixture of melt and water while cooling to a temperature near ambient temperature (15°–25° C.) to form a stable wax dispersion, and, blending into the mixture an air bleeding pigment in a size range greater than 50 millimicrons and in an amount sufficient to bleed air trapped between the tire and the mold's surface, and between the inner surface of the tire and the inner bladder, so as to form a stable tire paint having a solids content from 10% to about 60% by wt.

The effectiveness of our latex-free tire paints as effective binders is gauged visually by examining the curing molds after the tires are stripped from them. No flakes of cooked paint are observed in the mold cavity; neither are there any flaky deposits left in the tire, or on the bladder which strips from the inner liner of the cured tire smoothly. Further, a visual examination of the inner and outer surfaces of the cured tire show no sign of entrapped air. The color of the surfaces is uniform and there are no marks on the surfaces typical of those obtained when air is trapped.

The ease (or difficulty) with which entrapped air is bled out of the interface between the inner liner of the tire and the bladder is measured in a test in which a predetermined amount (20 in$^3$) of air is pumped between a sample of inner liner material and bladder material, both maintained at curing temperature (about 280° F.), and pressed together under constant pressure. The inner liner sample is painted with 20 g/m$^2$ of inside tire paint starting with a wax dispersion made according to the following recipe:

| Ingredient | Weight, lb. |
| --- | --- |
| P'wax 55 | 18.1 |
| P'wax 72 | 7.55 |
| Carnauba wax (m p 82° C.) | 4.53 |
| Oleic acid | 6.13 |
| Monoethanolamine | 1.76 |
| Triton X100 and Igepal CO630 | 0.7 |
| Zinc stearate | 1.03 |
| Water | 63. |

The wax dispersion was made as described in Example 1 hereinabove. The inside tire paint was then formulated having the following recipe:

| Ingredient | Weight, lb. |
| --- | --- |
| Wax dispersion (42% solids) | 320. |
| Water | 43. |
| Triton X100 & Igepal CO630 | 7.5 |
| Mica | 112.0 |

The water and surfactants were blended with the wax dispersion. Then the mica was added to the mix and stirred.

A similar test procedure is carried out with an inner liner and bladder sample, in which the former is painted with an inner tire paint made according to the recipe given in Example 1 of the '852 patent. The results are compared in FIG. 1.

The ease (or difficulty) with which entrapped air is bled out of the interface between the outer surface of the tire and the metal surface of the mold cavity, is measured in a manner analogous to that described hereinabove, starting with a wax dispersion made according to the following recipe:

| Ingredient | Weight, lb. |
| --- | --- |
| P'wax 55 | 27.95 |
| Oleic acid | 5.59 |
| Monoethanolamine | 1.29 |
| Surfactants | 0.5 |
| Water | 6.67 |

The wax dispersion is made as described in Example 2 hereinabove. The outside tire paint was then formulated having the following recipe:

| Ingredient | Weight, lb. |
| --- | --- |
| Water | 298. |
| Surfactants | 20.2 |
| N900 carbon black | 75. |
| Wax dispersion (39% solids) | 28.1 |
| Antifoam agent | 0.5 |

A similar test procedure is carried out with another tire tread sample and a polished metal disc, with the former being painted with 5 g/m² of outside paint made according to the recipe in the example in the '265 patent. The results are plotted in FIG. 2.

The ingredients were blended in the order: surfactant, carbon black, antifoam agent, and then the wax dispersion.

Referring now to FIG. 1 there is shown a plot in which the time it takes to bleed 20 cu ins of air forced between the painted inner liner (20 g/m²) sample at curing temperature, and a sample of bladder material placed in contact with the painted inner liner sample, is measured as a function of the amount of air bled at succeeding intervals. It is evident that the nearly vertical line for the latex-free inner paint indicates all the air is bled across the painted surface area in less than 5 secs. In contrast, the prior art paint (Ex 1 of the '852 patent), is seen to allow the air to bleed through more slowly, taking more than 15 secs.

Figure 2:
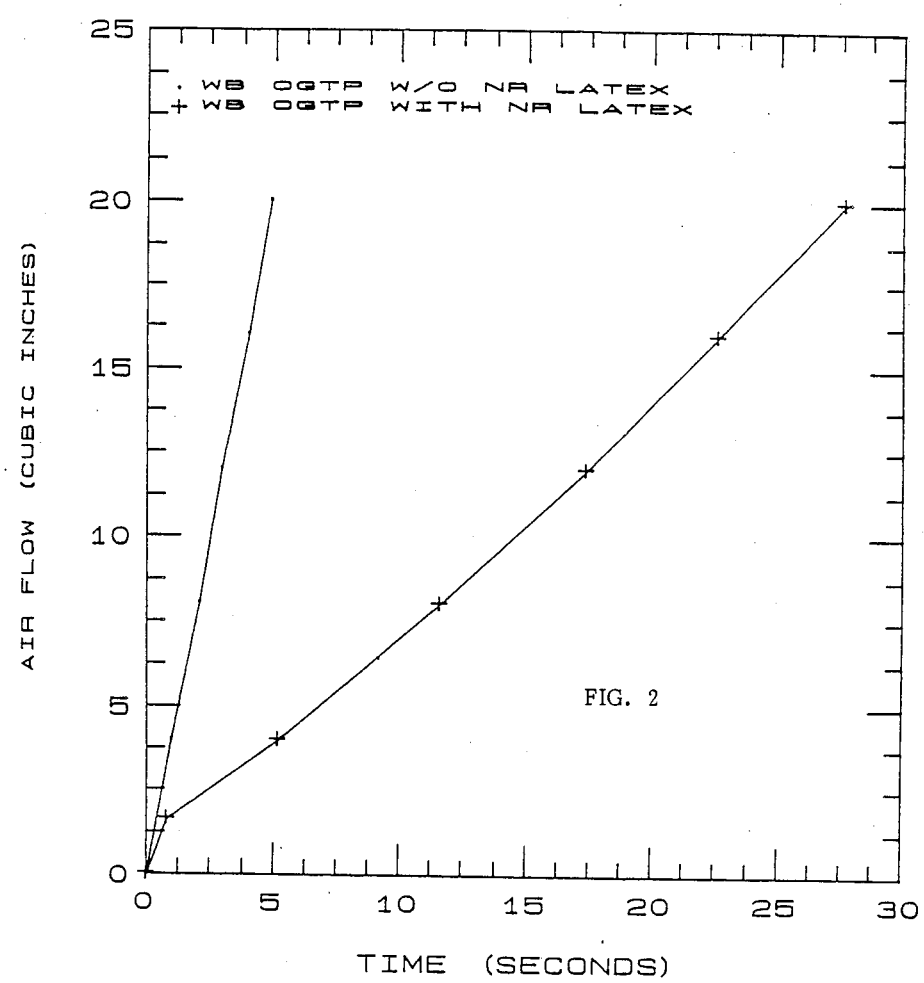
FIG. 2 is a plot of the time it takes to bleed 20 in$^3$ of air across the surface of each of two samples of a tire tread material, one painted with an outside tire paint containing rubber latex, the other omitting it, but otherwise containing analogous components.

Referring next to FIG. 2 there is shown a plot in which the time it takes to bleed 20 cu ins of air between a painted tire tread sample and the polished surface of a metal disc (simulating the mold cavity's surface), maintained in contact with one another under pressure, is measured as a function of the amount of air bled at succeeding intervals. It is evident that the steep line for the latex-free outer paint indicates that all the air is bled in about 5 secs. In contrast, the prior art outside paint of the example of the '265 patent, with rubber latex, takes more than 25 secs to bleed out.

We claim:

1. An aqueous inside/outside paint for a green tire to be vulcanized in a mold in cooperation with an inner bladder, said paint to be used for coating the inside and outside surfaces of the tire, said paint comprising,
   (a) a wax dispersion containing a major amount, based on the total weight of wax in the dispersion, of at least one lower melting point wax having a melting point (mp) in the range from about 50° C. to about 80° C., and from 0 to less than 50 percent by weight (% by wt) of a higher melting wax having a mp in the range from about 80° C. to about 90° C.,
   (b) an air bleeding pigment in an amount and in a size range greater than 50 millimicrons sufficient to bleed air trapped between the tire and the mold's surface, and between the inner surface of the tire and the inner bladder, and,
   (c) a surfactant in an amount sufficient to maintain said wax and pigment in a stable dispersion in water at a temperature range from about 10° C. to about 60° C.,
   wherein said paint is essentially free of rubber latex, silicone release agent and hydrocarbon solvent, and has a solids content of from about 10% to about 60% by wt based on the total weight of the paint.

2. The paint of claim 1 wherein said pigment is neutralized by adding thereto a neutralizing agent.

3. The paint of claim 2 wherein said surfactant includes an antifoaming agent.

4. The inside paint of claim 1 wherein said inside surface of said green tire is painted,
   said wax dispersion contains at least 51% by wt of said lower melting wax and from 6 to about 49% by wt of said higher melting wax, based on the total weight of wax,
   said pigment is mica present in an amount such that the ratio of wax to mica is in the range from about 1:3 to about 3:1, and,
   the solids content of said inside paint is in the range from about 30% to about 60% by wt.

5. The outside paint of claim 1 wherein said outside surface of green tire is painted,
   said wax dispersion contains from 0 to about 10% by wt of said higher melting wax, the remaining wax being lower melting wax,
   said pigment is nonpelletized carbon black present in an amount such that the ratio of wax to carbon black is in the range from about 1:6 to about 1:1, and,
   the solids content of said outside paint is in the range from about 10 to about 40% by wt.

6. The inside paint of claim 4 wherein said lower melting wax consists essentially of a blend of two or more paraffin waxes, one stepped from the mp of another by about 15° C. to about 25° C., and said higher melting wax is carnauba wax having a mp of about 82° C.

7. The outside paint of claim 5 wherein said lower melting wax is only one paraffin wax or a mixture of paraffin waxes, and said higher melting wax is present in an amount less than about 6% by wt.

8. A method of producing an inside/outside aqueous tire paint essentially free of silicone release agent, hydrocarbon solvent and rubber latex, said paint to be used for coating the inside and outside surfaces of a green tire to be vulcanized in a mold in cooperation with an inner bladder, said method comprising,
   (a) heating wax to a temperature above its melting point to form a melt,
   (b) adding a fatty acid and an amine to said melt,
   (c) adding a surfactant to said melt,
   (d) adding hot water heated to a temperature above the melting point of said wax to said melt,
   (e) agitating the mixture of melt and water while cooling to a temperature near ambient temperature to form a stable wax dispersion, and,
   (f) blending into said mixture an air bleeding pigment in a size range greater than 50 millimicrons and in an amount sufficient to bleed air trapped between the tire and the mold's surface, and between the inner surface of the tire and the inner bladder,
   so as to form a stable tire paint having a solids content from about 10% to about 60% by wt.

* * * * *